(12) United States Patent
Hiramatsu et al.

(10) Patent No.: US 11,306,796 B2
(45) Date of Patent: Apr. 19, 2022

(54) IMPACT ABSORBING MEMBER AND METHOD FOR MANUFACTURING IMPACT ABSORBING MEMBER

(71) Applicant: TOYOTA JIDOSHA KABUSHIKI KAISHA, Toyota (JP)

(72) Inventors: Koichi Hiramatsu, Toyota (JP); Atsushi Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/109,664

(22) Filed: Dec. 2, 2020

(65) Prior Publication Data
US 2021/0190168 A1 Jun. 24, 2021

(30) Foreign Application Priority Data
Dec. 20, 2019 (JP) .............................. JP2019-230111

(51) Int. Cl.
*F16F 7/12* (2006.01)
*B21D 9/14* (2006.01)

(52) U.S. Cl.
CPC ................. *F16F 7/12* (2013.01); *B21D 9/14* (2013.01); *F16F 2224/0208* (2013.01); *F16F 2226/04* (2013.01)

(58) Field of Classification Search
CPC .. F16F 7/12; F16F 2224/0208; F16F 2226/04; B21D 9/14
See application file for complete search history.

(56) References Cited

U.S. PATENT DOCUMENTS

2019/0383346 A1* 12/2019 Clayton .................... F41H 1/02

FOREIGN PATENT DOCUMENTS

| JP | 3928037 B2 | 6/2007 | |
| KR | 100765631 B1 * | 10/2007 | |
| KR | 20080101222 A * | 11/2008 | ............ E04F 15/20 |

* cited by examiner

*Primary Examiner* — Melanie Torres Williams
(74) *Attorney, Agent, or Firm* — Sughrue Mion, PLLC

(57) ABSTRACT

To provide an impact absorbing member that can be arranged flexibly in accordance with the shape of the space where the impact absorbing member is to be arranged. An impact absorbing member according to an exemplary aspect has a plurality of structural members each having hollow tetrahedron structures arranged continuously at prescribed intervals on an axis. Further, an impact absorbing member according to another exemplary aspect has a plurality of structural members woven by a connecting member that is disposed in a direction orthogonal to an axial direction of the structural members.

3 Claims, 16 Drawing Sheets

IMPACT ABSORBING MEMBER AND METHOD FOR MANUFACTURING IMPACT ABSORBING MEMBER

CROSS REFERENCE TO RELATED APPLICATIONS

This application is based upon and claims the benefit of priority from Japanese patent application No. 2019-230111, filed on Dec. 20, 2019, the disclosure of which is incorporated herein in its entirety by reference.

BACKGROUND

The present disclosure relates to an impact absorbing member and a method for manufacturing the impact absorbing member.

An impact energy absorbing member that has a hollow element and absorbs impact energy by causing the hollow element to be crushed and deformed is known. Japanese Patent No. 3928037 (Patent Literature 1) discloses an impact energy absorbing member in which a one-dimensional impact energy structural element (a metallic porus element component) having a structure in which pseudo hollow metal spheres each having a spherical bulge are linearly formed in a continuous manner is laminated.

SUMMARY

However, there has been a problem that with the energy absorbing member disclosed in Patent Literature 1, it was difficult to laminate the impact energy structural element at an optimal position in accordance with a shape of the space where the energy absorbing member is to be arranged.

The present disclosure has been made in view of the background mentioned above, and an object of the present disclosure is to provide an impact absorbing member that can be arranged flexibly in accordance with the shape of the space where the impact absorbing member is to be arranged.

An impact absorbing member according to an exemplary aspect includes a plurality of structural members each having hollow tetrahedron structures arranged continuously at prescribed intervals on an axis, in which the plurality of structural members are arranged in parallel and woven by a connecting member that is disposed in a direction orthogonal to an axial direction of the structural members.

Since the plurality of structural members each having hollow tetrahedron structures arranged continuously at prescribed intervals on an axis are woven, the impact absorbing member can be folded flexibly without causing the structural members to be separated. Accordingly, it is possible to arrange the impact absorbing member flexibly in accordance with the shape of the space where the impact absorbing member is to be arranged.

A method for manufacturing an impact absorbing member according to another exemplary aspect includes:

forming hollow tetrahedron structures continuously at prescribed intervals by alternately crushing a hollow tube vertically and laterally in a tube radial direction; and arranging, in parallel, a plurality of structural members each having the hollow tetrahedron structures formed continuously at the prescribed intervals, and weaving the structural members with a connecting member.

With such a configuration, it is possible to easily manufacture an impact absorbing member that can be arranged flexibly in accordance with the shape of the space where the impact absorbing member is to be arranged.

Further, the hollow tube may be made of stainless steel. Since there is a wide variety of commercially available stainless steel pipes that can serve as the hollow tube, it is possible to manufacture a structural member relatively inexpensively.

According to the present disclosure, an impact absorbing member can be flexibly arranged in accordance with a shape of a space where the impact absorbing member is to be arranged.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
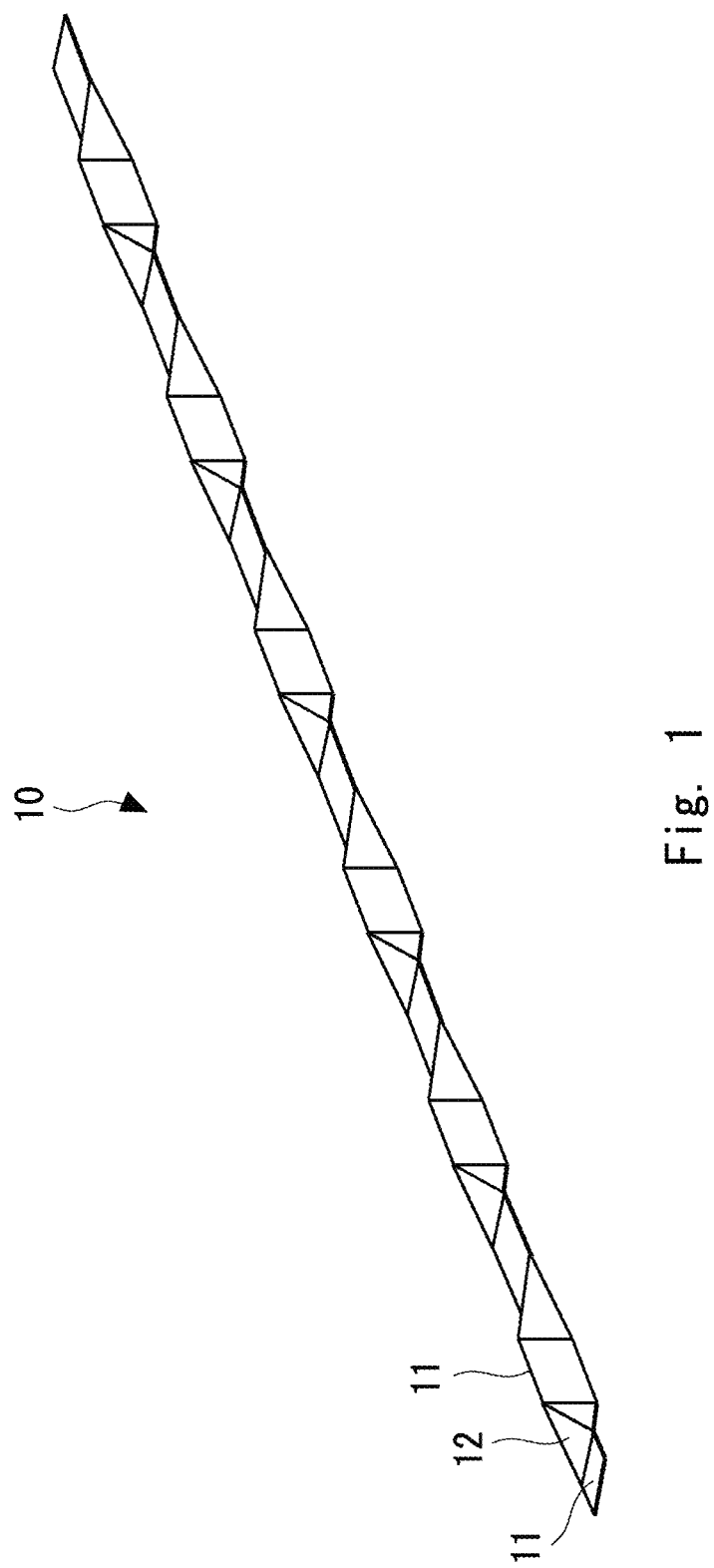
FIG. 1 is a perspective diagram showing a configuration of a structural member which is an element that constitutes an impact absorbing member according to an embodiment.

Hereinafter, the present disclosure will be described through embodiments of the present disclosure. However, the embodiments are not intended to limit the scope of the present disclosure according to the claims. Further, not all of the components/structures described in the embodiments are necessarily indispensable as means for solving the problem. For clarifying the explanation, the following description and the drawings are partially omitted and simplified where appropriate. The same symbols are assigned to the same elements in the drawings and duplicated explanations thereof are omitted where appropriate.

First, a configuration of a structural member 10 which is an element that constitutes an impact absorbing member according to the present embodiment is described with reference to FIG. 1. FIG. 1 is a perspective diagram showing the configuration of the structural member 10 which is an element that constitutes an impact absorbing member according to the present embodiment. As shown in FIG. 1, the structural member 10 includes hollow tetrahedron structures 12 that are formed continuously at prescribed intervals on an axis. A crushed part 11 is formed between the adjacent hollow tetrahedron structures 12. The material of the structural member 10 is, for example, stainless steel.

Figure 2:
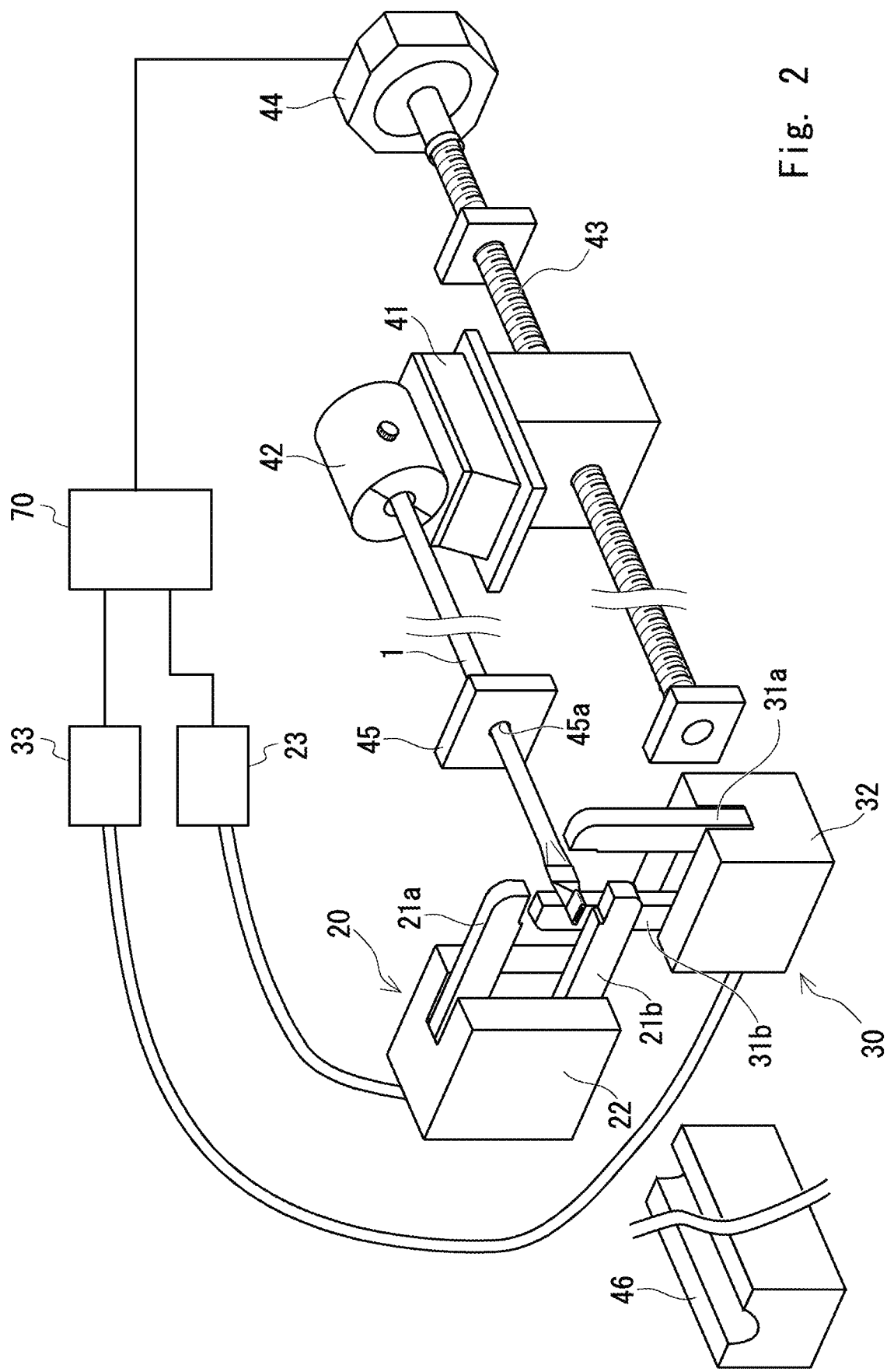
FIG. 2 is a schematic diagram showing a forming apparatus for forming the structural member which is an element that constitutes the impact absorbing member according to the embodiment.

FIG. 2 is a schematic diagram showing a forming apparatus for forming the structural member 10. As shown in FIG. 2, an end of a hollow tube 1 is held by a collet chuck 42. The collect chuck 42 has a cylindrical shape and can be divided in half. The collet chuck 42 includes at the center thereof a retaining part that retains the hollow tube 1. The collect chuck 42 is disposed on a slider 41.

The slider 41 is configured to be moved linearly by the rotation of a ball screw 43. The ball screw 43 is connected to a servomotor 44 whose one end is a driving source. When the ball screw 43 is rotated by the servomotor 44, the slider 41 moves towards a first pinch tool 20 and a second pinch tool 30 whereby the hollow tube 1 is fed in the direction of the first pinch tool 20 and the second pinch tool 30. The servomotor 44 is controlled by a control unit 70.

The hollow tube 1 is supported by a material alignment guide 45 at a position in the vicinity of but before being fed to the first pinch tool 20 and the second pinch tool 30. A penetrating hole 45a having a diameter that is slightly larger than a diameter of the hollow tube 1 is formed in the material alignment guide 45. In other words, the hollow tube 1 penetrates the penetrating hole 45a and is fed in the direction of the first pinch tool 20 and the second pinch tool 30.

The first pinch tool 20 is a tool for crushing the hollow tube 1 laterally. The first pinch tool 20 includes holding parts 21a and 21b, a driving unit 22, and an air feeding unit 23. The first pinch tool 20 operates so as to close the holding parts 21a and 21b when air is fed at a given pressure from the air feeding unit 23 to the driving unit 22 and to open the holding parts 21a and 21b when the air fed to the driving unit 22 is deflated. The air feeding unit 23 is controlled by the control unit 70.

The second pinch tool 30 is a tool for crushing the hollow tube 1 vertically. The second pinch tool 30 includes holding parts 31a and 31b, a driving unit 32 to which working fluid is fed from a working fluid feeding unit 33, and the working fluid feeding unit 33. The second pinch tool 30 operates so as to close the holding parts 31a and 31b when working fluid such as air is fed at a given pressure to the driving unit 32 and to close the holding parts 31a and 31b when the working fluid fed to the driving unit 32 is deflated. The working fluid feeding unit 33 is controlled by the control unit 70.

Figure 3:
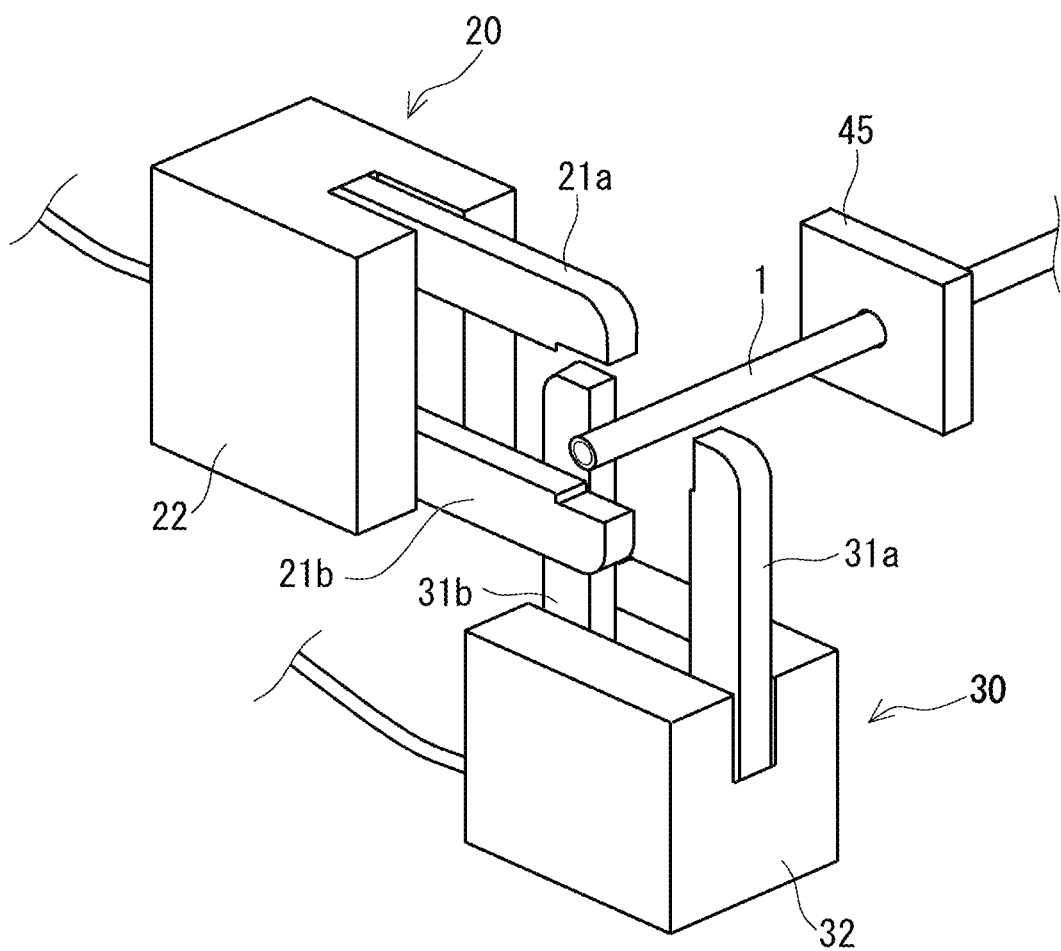
FIG. 3 is a schematic diagram describing a step of forming a structural member having hollow tetrahedron structures continuously formed at prescribed intervals from a hollow tube.
Figure 4:
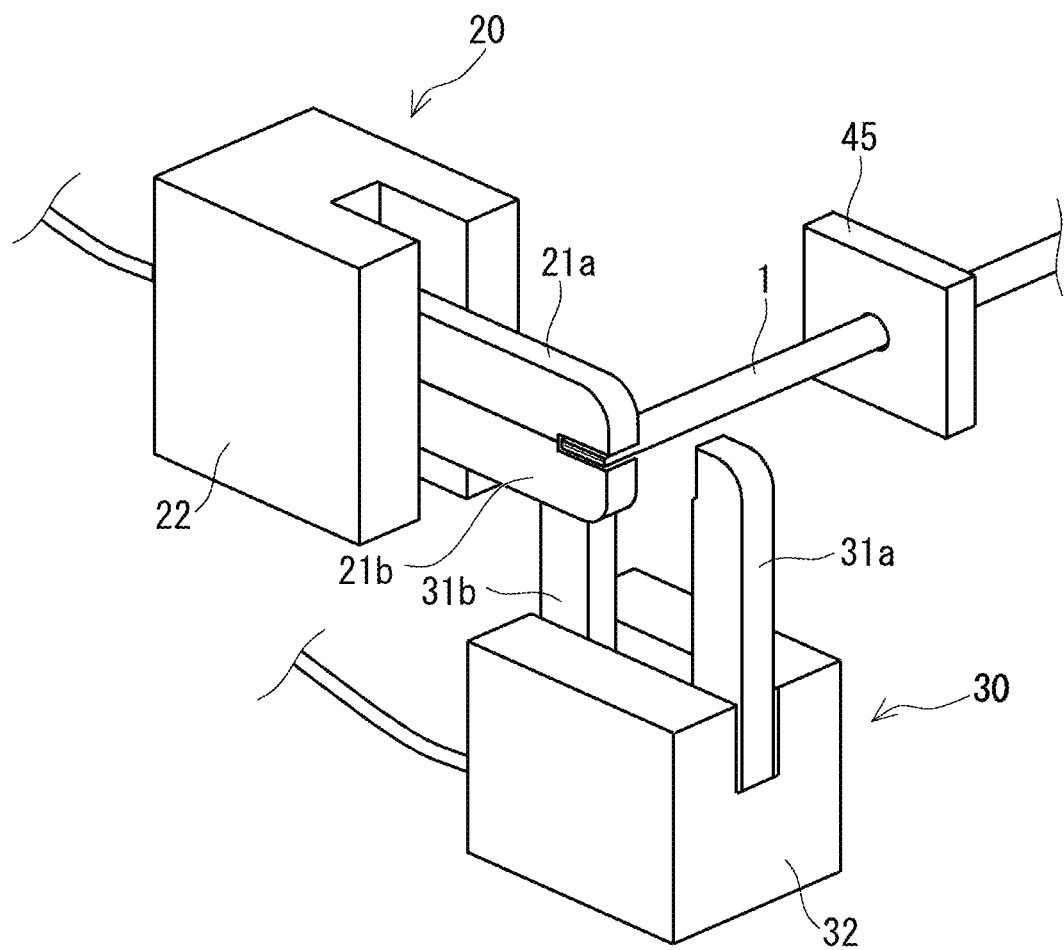
FIG. 4 is a schematic diagram describing a step of forming a structural member having hollow tetrahedron structures continuously formed at prescribed intervals from a hollow tube.

FIGS. 3 to 6 are schematic diagrams for describing steps of forming the structural member in which hollow tetrahedron structures are continuously formed at prescribed intervals by forming the hollow tube 1. First, as shown in FIG. 3, the hollow tube 1 is fed so that the part of the hollow tube 1 where a laterally crushed part is to be formed is set to be at the position where the holding parts 21a and 21b of the first pinch tool 20 are disposed. Then, as shown in FIG. 4, the holding parts 21a and 21b of the first pinch tool 20 are closed to crush the hollow tube 1 laterally. Accordingly, a laterally crushed part is formed in the hollow tube 1.

Figure 5:
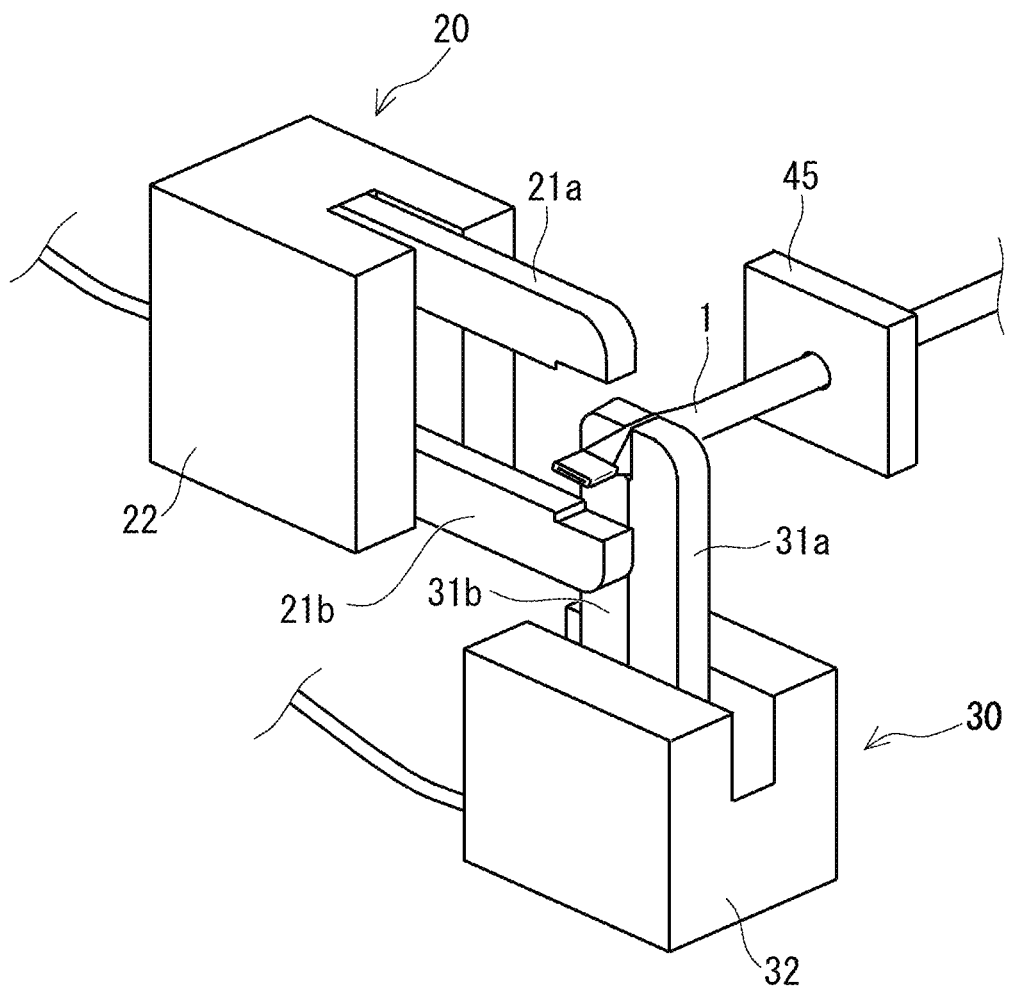
FIG. 5 is a schematic diagram describing a step of forming a structural member having hollow tetrahedron structures continuously formed at prescribed intervals from a hollow tube.
Figure 6:
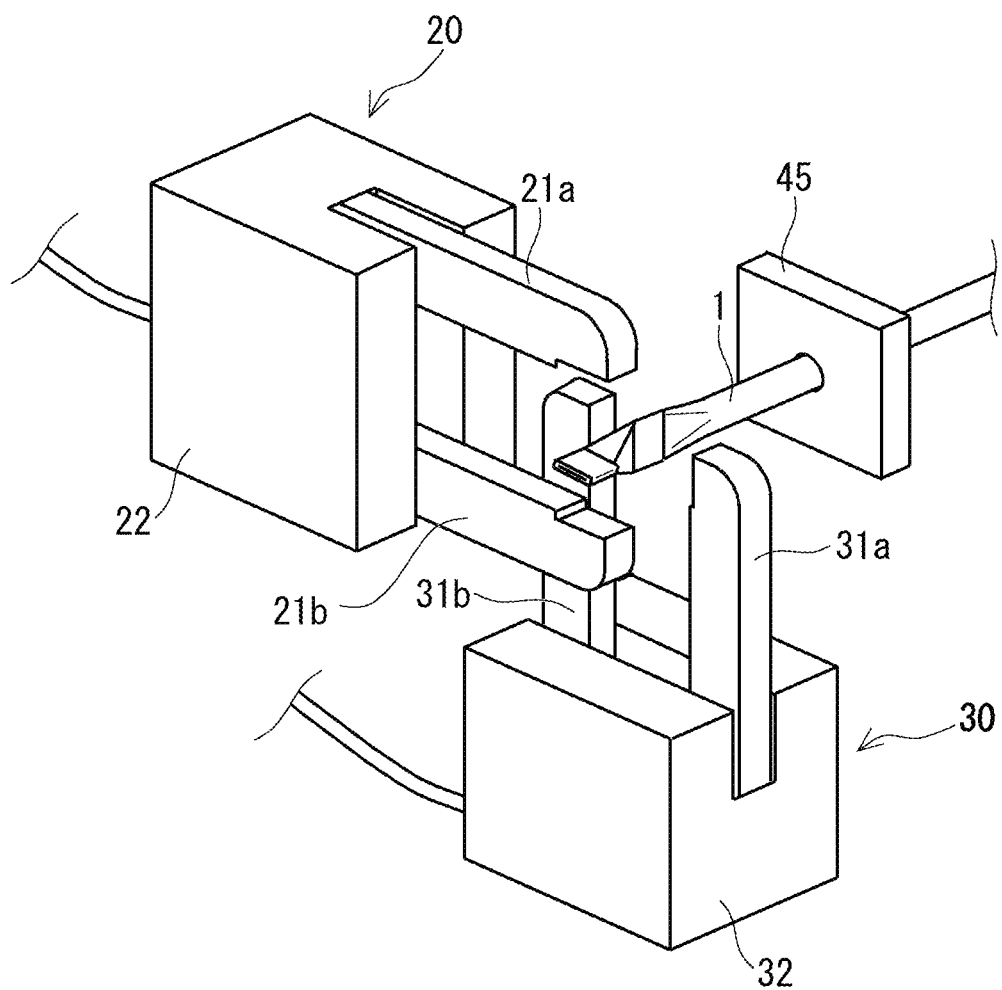
FIG. 6 is a schematic diagram describing a step of forming a structural member having hollow tetrahedron structures continuously formed at prescribed intervals from a hollow tube.

Next, after the holding parts 21a and 21b are opened, the hollow tube 1 is fed by a prescribed distance so that the part of the hollow tube 1 where the vertically crushed part is to be formed is set to be at the position where the holding parts 31a and 31b of the second pinch tool 30 are disposed. Then, as shown in FIG. 5, the holding parts 31a and 31b of the second pinch tool 30 are closed. When the holding parts 31a and 31b are opened, a vertically crushed part is formed in the hollow tube 1 with a prescribed interval between the laterally crushed part formed in advance as shown in FIG. 6. Accordingly, it is possible to form a hollow tetrahedron structure between the laterally crushed part and the vertically crushed part.

By repeating the operations shown in FIGS. 3 to 6, the hollow tube 1 is alternately crushed vertically and laterally in a continuous manner in a tube radial direction with a prescribed interval between the vertically crushed part and the laterally crushed part. Accordingly, a structural member in which hollow tetrahedron structures are continuously formed at prescribed intervals is formed.

Next, a step of forming an impact absorbing member 100 from a plurality of structural members 10 is described.

Figure 7:
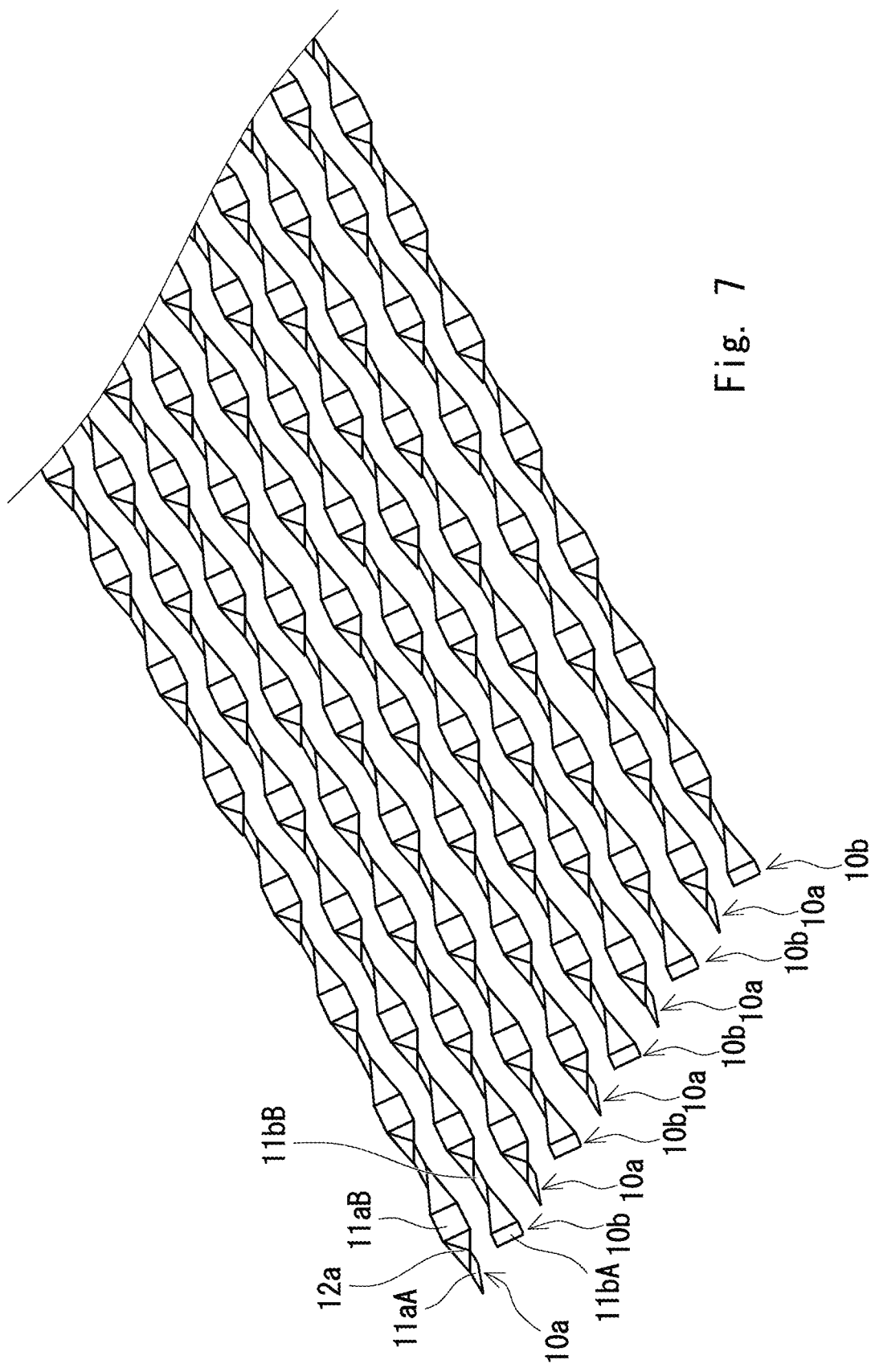
FIG. 7 is a schematic diagram showing a state in which the structural members each of which is an element that constitutes the impact absorbing member according to the embodiment are arranged in parallel.

FIG. 7 is a schematic diagram showing a state in which the structural members 10 are arranged in parallel. Here, the structural members 10 that are adjacent to each other are referred to as structural members 10a and 10b for convenience of the explanation. In the structural member 10a, the laterally crushed part 11 is referred to as a crushed part 11aA, the vertically crushed part 11 is referred to as a crushed part 11aB, and the hollow tetrahedron structure 12 formed between the crushed parts 11aA and 11aB is referred to as a hollow tetrahedron structure 12a. In the structural member 10b, the laterally crushed part is referred to as a crushed part 11bA, the vertically crushed part is referred to as a crushed part 11bB, and the hollow tetrahedron structure 12 formed between the crushed parts 11bA and 11bB is referred to as a hollow tetrahedron structure 12b. As shown in FIG. 7, the adjacent structural members 10a and 10b are arranged with their phases shifted from each other at an angle of 90° so as to be symmetrical.

Figure 8:
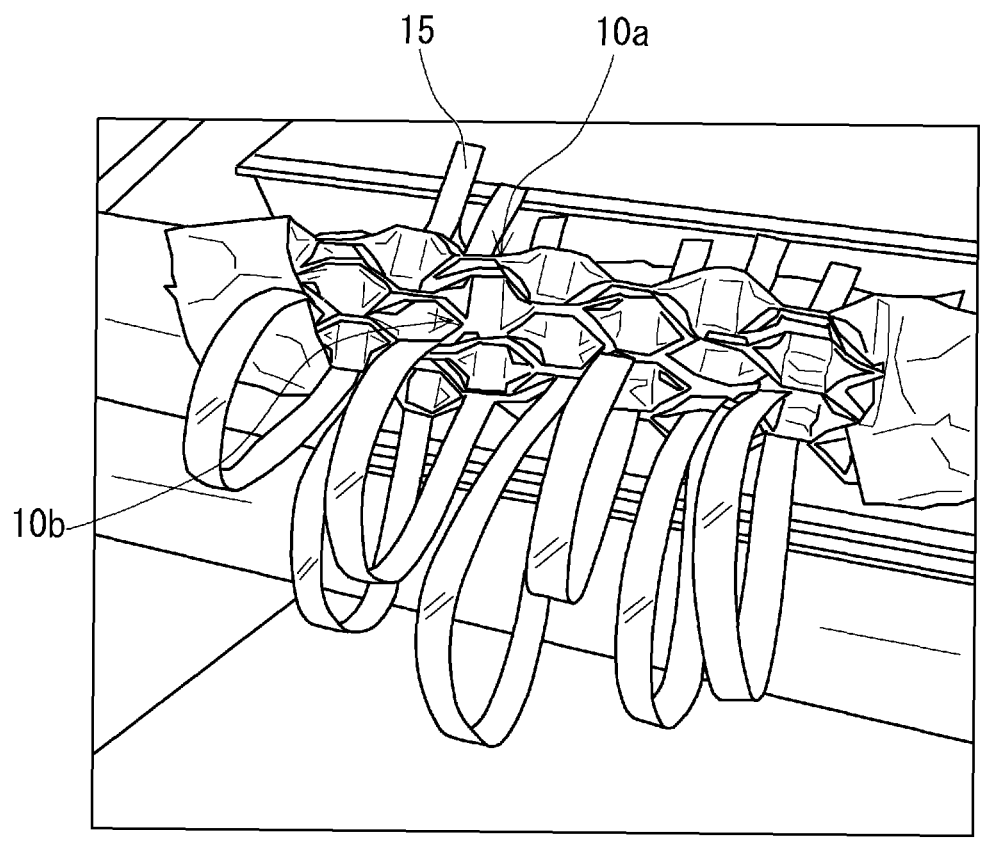
FIG. 8 is a photograph for describing a step of forming the impact absorbing member according to the embodiment.
Figure 9:
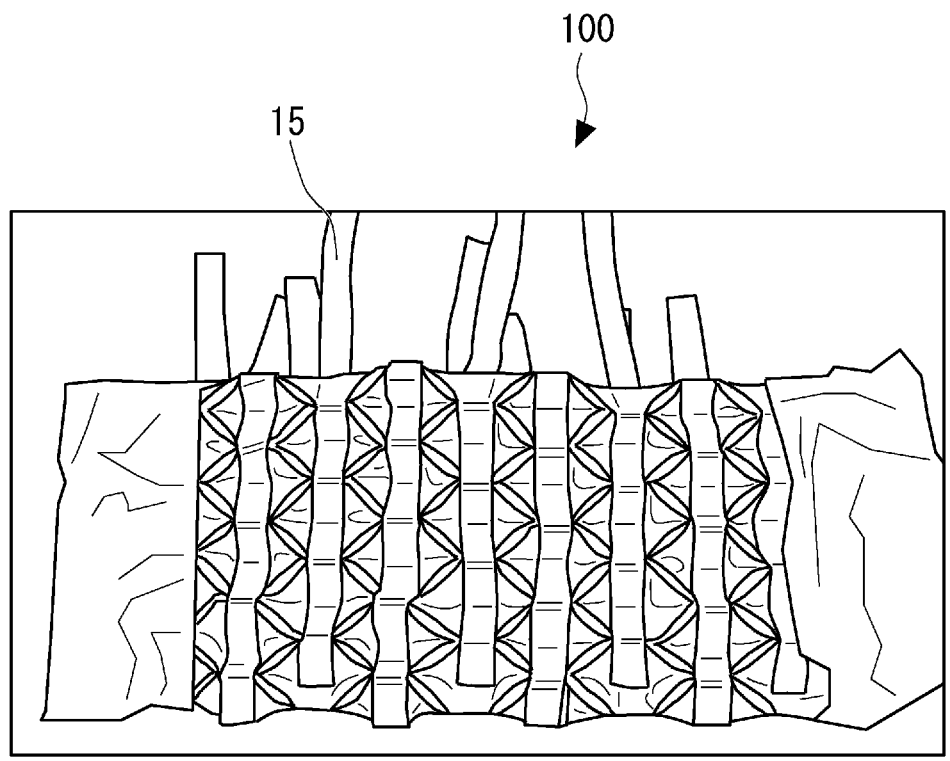
FIG. 9 is a photograph for describing a step of forming the impact absorbing member according to the embodiment.

FIGS. 8 and 9 are photographs for describing a step of forming the impact absorbing member 100 (a weaving step). As shown in FIGS. 8 and 9, the structural members 10a and 10*b* arranged in parallel are woven by a band-like connecting member 15 that is disposed in a direction orthogonal to an axial direction of the structural members 10*a* and 10*b*. FIG. 8 shows a state at the beginning of the weaving and FIG. 9 shows a state after the weaving is finished.

Figure 10:
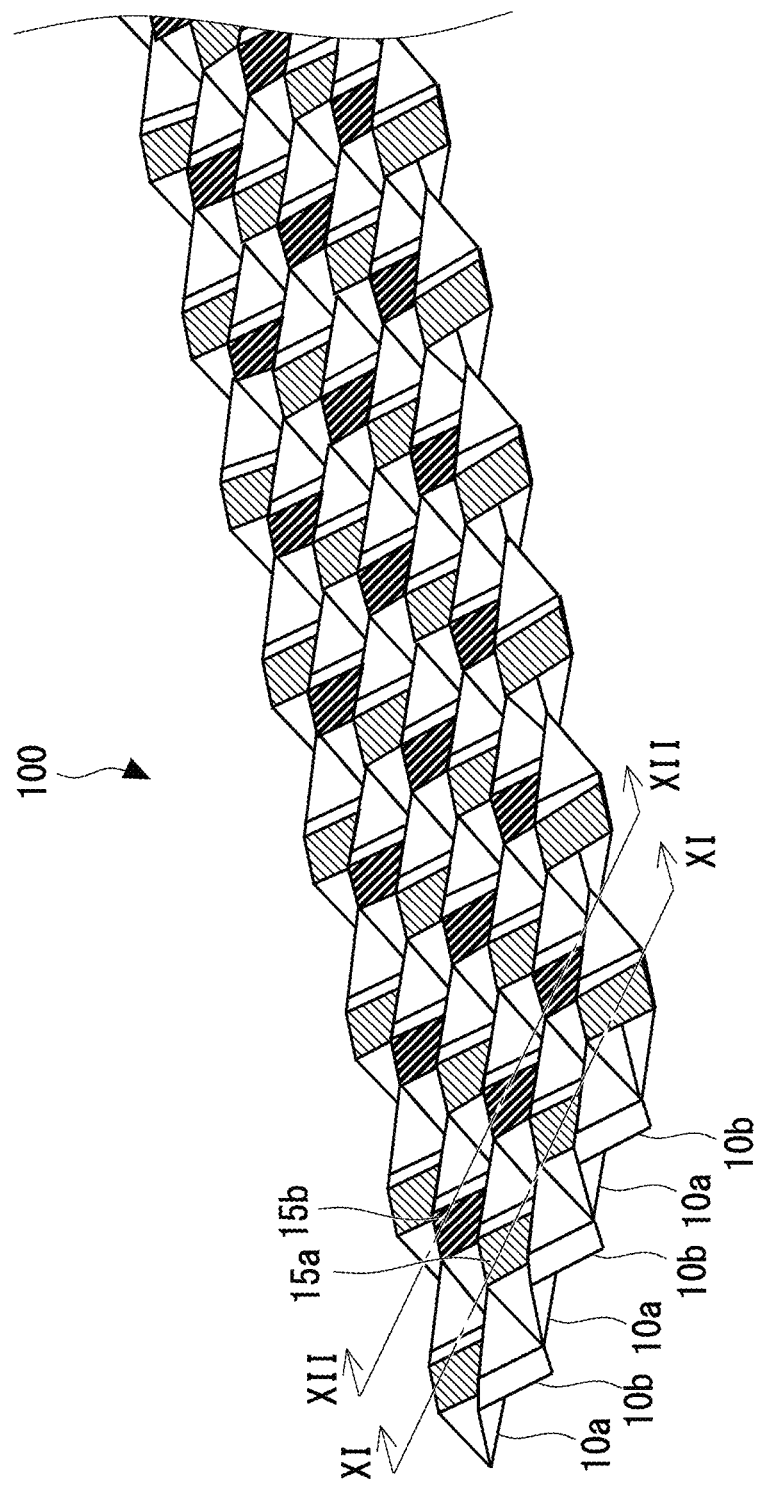
FIG. 10 is a perspective diagram of the impact absorbing member according to the embodiment.
Figure 11:
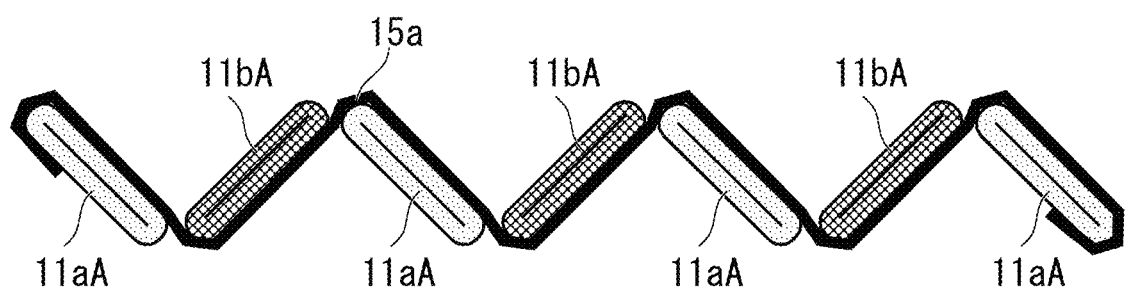
FIG. 11 is a cross-sectional diagram cut along a line XI-XI in FIG. 10.
Figure 12:
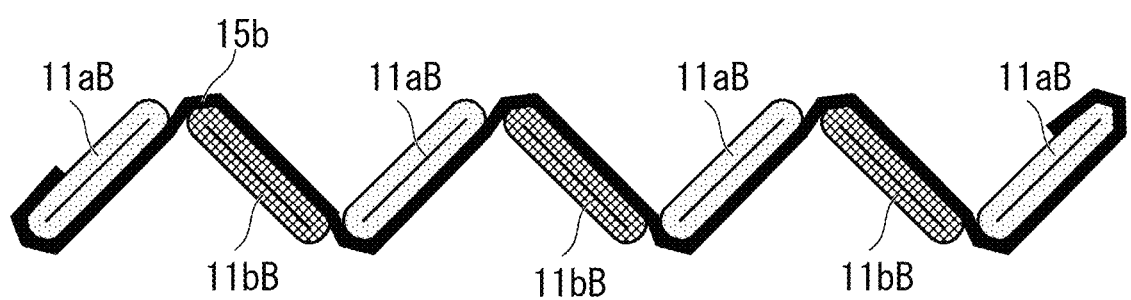
FIG. 12 is a cross-sectional diagram cut along a line XII-XII in FIG. 10.

FIGS. 10 to 12 are diagrams that describe the configuration of the impact absorbing member 100. FIG. 10 is a perspective diagram of the impact absorbing member 100, FIG. 11 is a sectional diagram cut along a line XI-XI shown in FIG. 10, and FIG. 12 is a sectional diagram cut along a line XII-XII shown in FIG. 10. In FIGS. 10 to 12, the connecting member 15 along which the laterally crushed parts (the laterally crushed part 11*a*A of the structural member 10*a* and the laterally crushed part 11*b*A of the structural member 10*b*) are arranged is referred to as a connecting member 15*a* for the sake of explanation. Further, the connecting member 15 along which the vertically crushed parts (the vertically crushed part 11*a*B of the structural member 10*a* and the vertically crushed part 11*b*B of the structural member 10*b*) are arranged is referred to as a connecting member 15*b*.

As shown in FIGS. 10 and 11, the connecting member 15*a* is disposed so as to be laid along the upper side of the laterally crushed part 11*a*A of the structural member 10*a* and the lower side of the laterally crushed part 11*b*A of the structural member 10*b* in order. Further, as shown in FIGS. 10 and 12, the connecting member 15*b* is disposed so as to be laid along the lower side of the vertically crushed part 11*a*B of the structural member 10*a* and the upper side of the vertically crushed part 11*b*B of the structural member 10*b* in order.

As described above, in the impact absorbing member 100, since the structural members 10*a* and 10*b* are alternately arranged in parallel and are woven by the connecting members 15*a* and 15*b*, respectively, the plurality of structural members 10 do not separate from one another. Further, the impact absorbing member 100 having such configuration can be folded flexibly.

Next, a result of a test on an impact absorbing ability of the structural member 10 is described.

In the test, the plateau stress [MPa] and the absorbed energy [kJ/kg] per unit mass for each of the three structural members 10 formed from the hollow tubes 1 of different specifications were evaluated. Here, the plateau stress refers to the stress in the plateau region in a compressive stress-compressive strain curve and is an average value of the compressive stress at the compressive strain of normally 20 to 30%.

Figure 13:
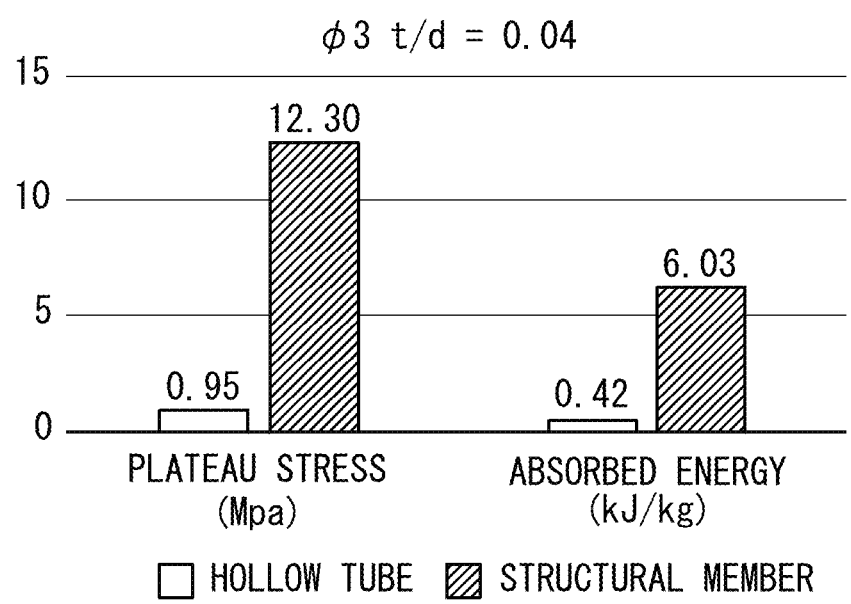
FIG. 13 is a graph showing evaluation results of plateau stress and absorbed energy in a hollow tube and a structural member that constitutes the impact absorbing member according to the embodiment.
Figure 14:
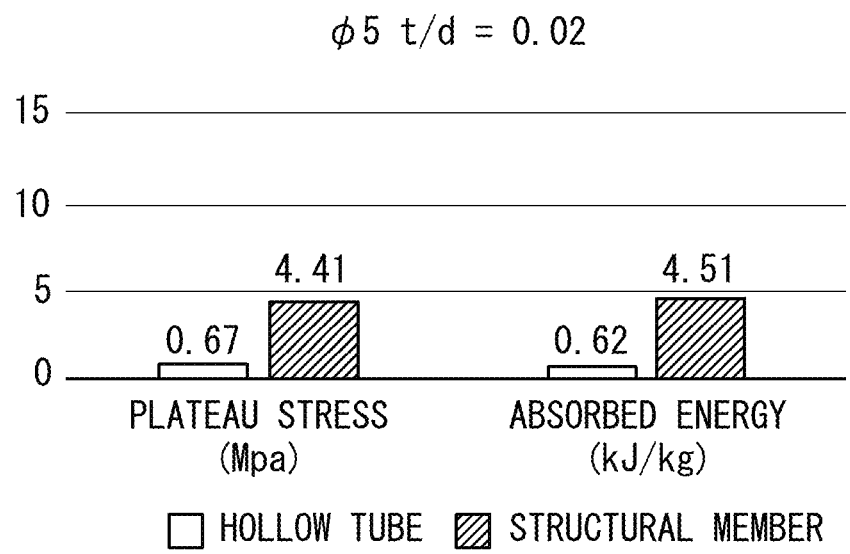
FIG. 14 is a graph showing evaluation results of plateau stress and absorbed energy in a hollow tube and a structural member that constitutes the impact absorbing member according to the embodiment.
Figure 15:
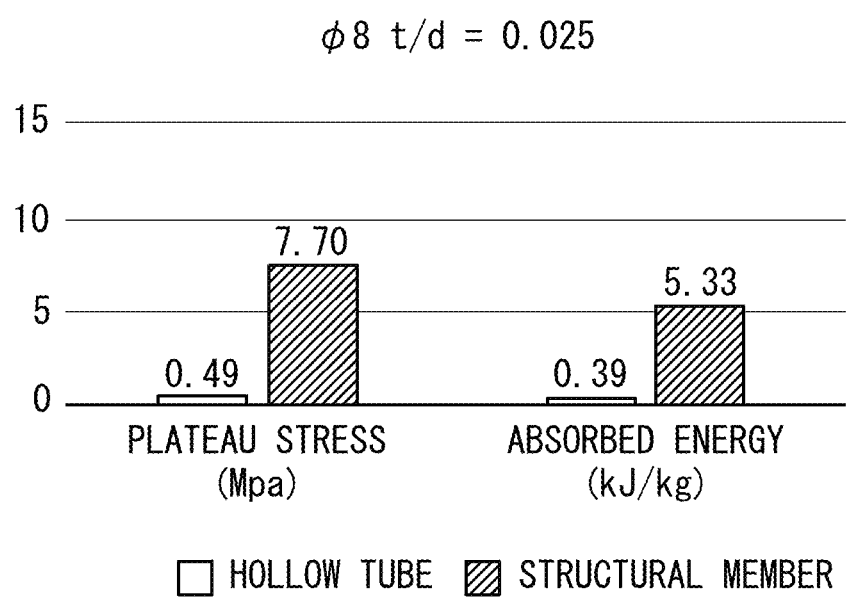
FIG. 15 is graph showing evaluation results of plateau stress and absorbed energy in a hollow tube and a structural member that constitutes the impact absorbing member according to the embodiment.

FIGS. 13 to 15 are graphs showing evaluation results of the plateau stress and the absorbed energy per unit mass in the hollow tube 1 and the structural member 10. FIG. 13 shows the result of the evaluation of the structural member 10 formed from the hollow tube 1 having a diameter d of 3 mm and a thickness t of 0.12 mm (t/d=0.04). FIG. 14 shows the result of the evaluation of the structural member 10 formed from the hollow tube 1 having a diameter d of 5 mm and a thickness t of 0.1 mm (t/d=0.02). FIG. 15 shows the result of the evaluation of the structural member 10 formed from the hollow tube 1 having a diameter d of 8 mm and a thickness t of 0.2 mm (t/d=0.025). Each of the hollow tubes 1 is a commercially available stainless steel tube and can be obtained relatively inexpensively.

As shown in FIGS. 13 to 15, in each case, the plateau stress and the absorbed energy of the structural member 10 were improved by 7-fold or more compared to those of the hollow tube 1 which is merely a material.

Figure 16:
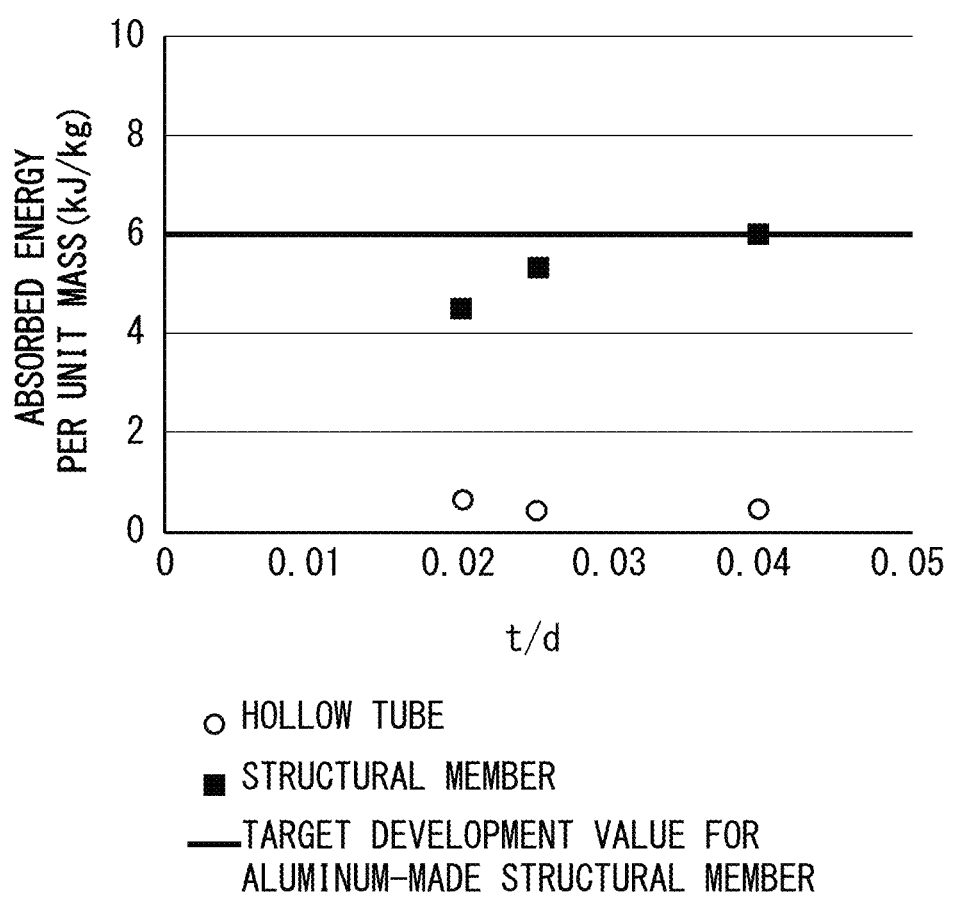
FIG. 16 is a graph showing relationships between the absorbed energy per unit mass and t/d.

The structural member 10 that configures the impact absorbing member 100 is required not only to be large in its absorbed energy but also to be light-weighted. FIG. 16 is a graph showing relationships between the absorbed energy per unit mass and t/d. In the graph, the horizontal axis indicates t/d and the vertical axis indicates the absorbed energy per unit mass. Further, the results of the evaluation of the structural member 10 shown in FIG. 13 are plotted at t/d=0.04, the results of the evaluation of the structural member 10 shown in FIG. 14 are plotted at t/d=0.02, and the results of the evaluation of the structural member 10 shown in FIG. 15 are plotted at t/d=0.025. Note that the development target value of the absorbed energy per unit mass in the structural member made of aluminum is 6 kJ/kg, the value being indicated by a bold line in the graph.

As shown in FIG. 16, the structural member 10 in which t/d=0.04 (the structural member 10 shown in FIG. 13) has the same development target value as that of the structural member made of aluminum. As for the structural member 10 in which t/d=0.02 (the structural member 10 shown in FIG. 14) and the structural member 10 in which t/d=0.025 (the structural member 10 shown in FIG. 15), although the development target values thereof were lower than those of the structural members made of aluminum, they were around 70 to 80% of the target values of the structural members made of aluminum.

Figure 17:
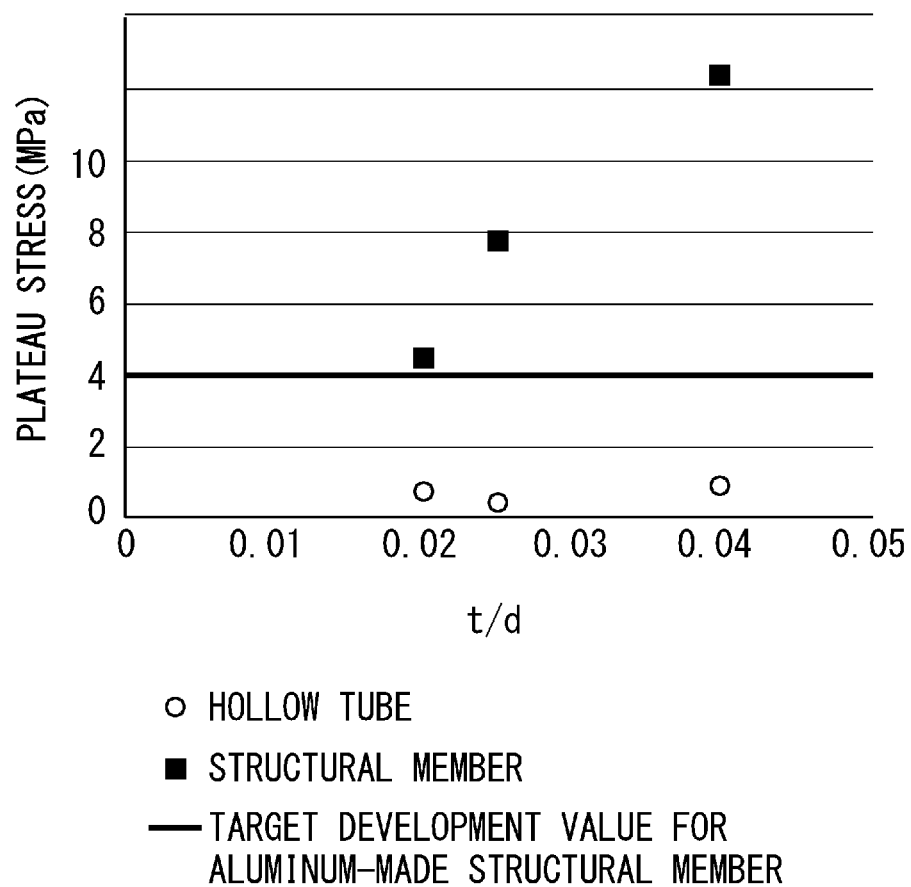
FIG. 17 is a graph showing relationships between the plateau stress and t/d.

FIG. 17 is a graph showing relationships between the plateau stress and t/d. In the graph, the results of the evaluation of the structural member 10 shown in FIG. 13 are plotted at t/d=0.04, the results of the evaluation of the structural member 10 shown in FIG. 14 are plotted at t/d=0.02, and the results of the evaluation of the structural member 10 shown in FIG. 15 are plotted at t/d=0.025. Note that the development target value of the plateau stress in the structural member made of aluminum is 4 MPa, the value being indicated by a bold line in the graph.

As shown in FIG. 17, the value of the plateau stress in each of the three structural members 10 that were tested exceeded the development target value of the plateau stress in the structural member made of aluminum. In particular, the development target value of the plateau stress in each of the structural member 10 in which t/d=0.04 (the structural member 10 shown in FIG. 13) and the structural member 10 in which t/d=0.02 (the structural member 10 shown in FIG. 14) exceeds the development target value of the plateau stress in the structural member made of aluminum by 2-fold or more.

As described above, it is considered that all of the three structural members 10 that were tested are practically usable. Accordingly, the structural member 10 that sufficiently absorbs energy and is light-weighted can be manufactured using a commercially available stainless steel pipe that is relatively inexpensive.

Figure 18:
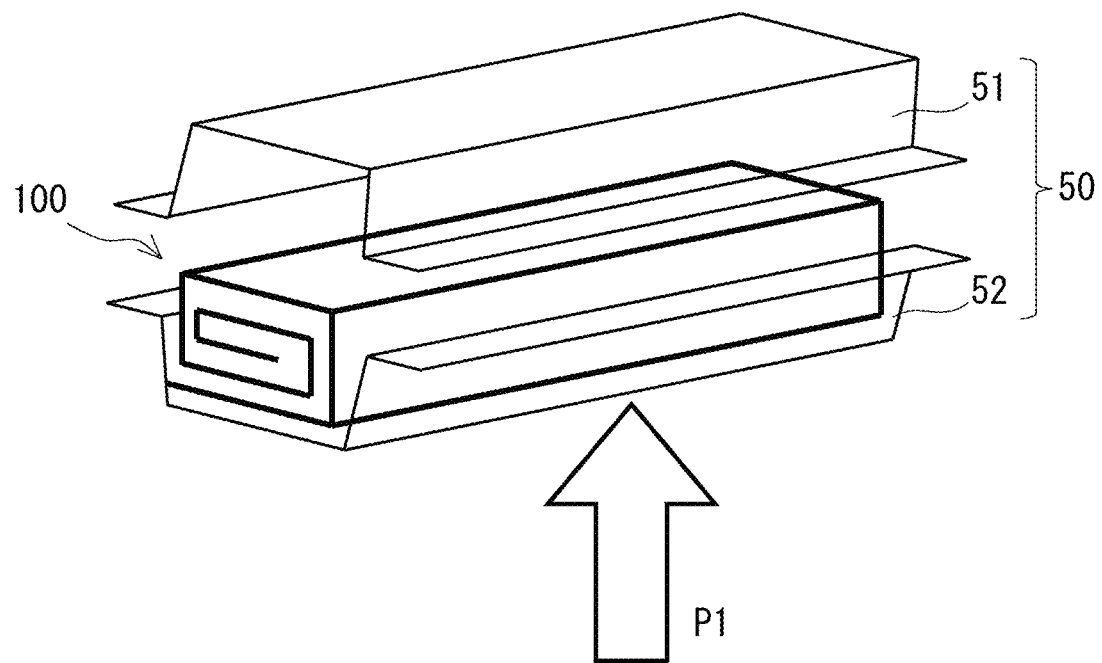
FIG. 18 is a schematic diagram showing an example in which the impact absorbing member is disposed in a rocker part of a vehicle body side part.

FIG. 18 is a schematic diagram showing an example in which the impact absorbing member 100 is disposed in a rocker part 50 of a vehicle body side part. As shown in FIG. 18, the rocker part 50 of the vehicle body side part is constituted of a vehicle-cabin-side case 51 and a vehicle-cabin-door-side case 52. When something collides on the side of the vehicle, a load is placed on the vehicle from the vehicle cabin door side toward the interior of the vehicle cabin in the horizontal direction. That is, when something collides on the side of the vehicle, the impact of the collision is applied on the rocker part 50 of the vehicle body side part in the direction of an arrow P1. Therefore, the impact absorbing member 100 is accommodated in a spirally-folded manner so that the absorbed energy becomes large in the direction of the arrow P1. By this configuration, it is possible to reduce the deformation of the rocker part 50 toward the vehicle cabin side when there is a collision on the side of the vehicle.

Figure 19:
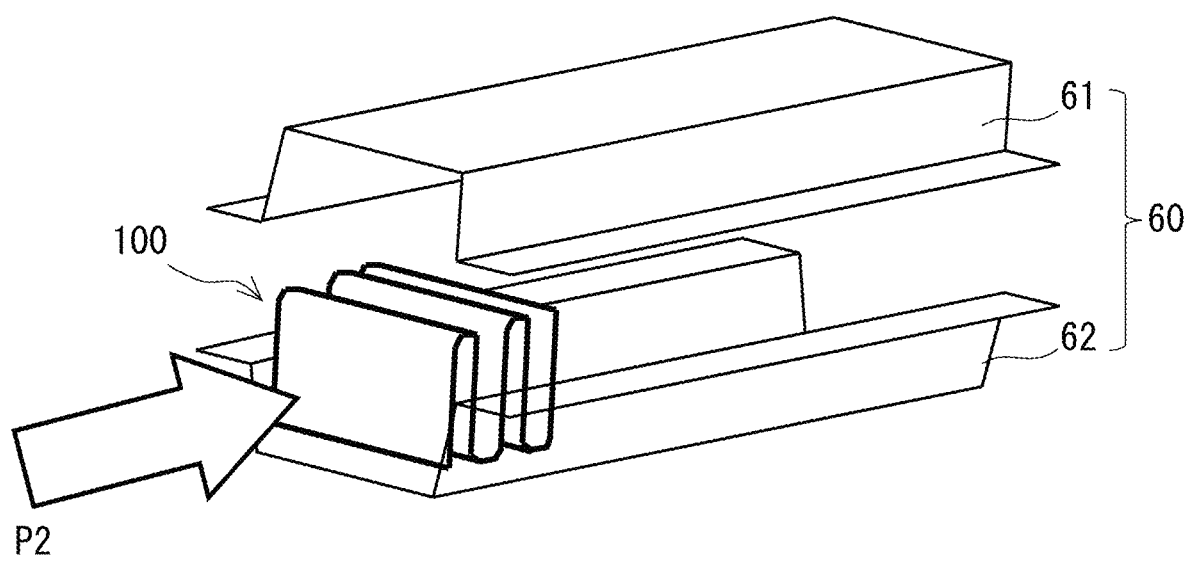
FIG. 19 is a schematic diagram showing an example in which the impact absorbing member is disposed in a front side member of a vehicle body front part.

FIG. 19 is a schematic diagram showing an example in which the impact absorbing member 100 is disposed in a front side member of a vehicle body front part. As shown in FIG. 19, the front side member 60 of the vehicle body front part is constituted of a first case 61 and a second case 62. When a head-on collision occurs, a load is placed on the vehicle from the hood side to the interior of the vehicle cabin in the horizontal direction. That is, when a head-on collision occurs, an impact of the collision is applied to the front side member 60 of the vehicle body side in the direction of an arrow P2. Accordingly, the impact absorbing member 100 is folded in a pulse waveform shape and accommodated in the front side member so that the absorbed energy in the direction of the arrow P2 becomes large. By this configuration, it is possible to reduce the deformation of the front side member 60 toward the vehicle cabin side when a head-on collision occurs.

As described above, since the impact absorbing member 100 has a plurality of the structural members 10 having the hollow tetrahedron structures continuously formed at prescribed intervals on an axis woven, the impact absorbing member can be folded flexibly. By this configuration, it is possible to flexibly arrange the impact absorbing member in accordance with the shape of the space where the impact absorbing member is to be arranged.

Note that the present disclosure is not limited to the embodiments described above and can be modified as appropriate without departing from the gist of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An impact absorbing member comprising a plurality of structural members each having hollow tetrahedron structures arranged continuously at prescribed intervals on an axis, wherein
    the plurality of structural members are arranged in parallel and woven by a connecting member that is disposed in a direction orthogonal to an axial direction of the structural members.

2. A method for manufacturing an impact absorbing member comprising:
    forming hollow tetrahedron structures continuously at prescribed intervals by alternately crushing a hollow tube vertically and laterally in a tube radial direction; and
    arranging, in parallel, a plurality of structural members in which the hollow tetrahedron structures are formed continuously at the prescribed intervals, and weaving the structural members with a connecting member.

3. The method for manufacturing the impact absorbing member according to claim 2, wherein the hollow tube is made of stainless steel.

* * * * *